United States Patent [19]

Ando et al.

[11] Patent Number: 4,738,194
[45] Date of Patent: Apr. 19, 1988

[54] APPARATUS FOR SEPARATING JUICE SACS OF CITRUS FRUITS

[75] Inventors: Toshifumi Ando; Toru Suzuki, both of Yashio; Kenji Ishii, Tokyo; Hiroko Omura; Jun Yamazaki, both of Koshigaya, all of Japan

[73] Assignee: Nippon Sanso Kabushiki Kaisha, Tokyo, Japan

[21] Appl. No.: 876,677

[22] Filed: Jun. 20, 1986

[30] Foreign Application Priority Data

Jun. 24, 1985 [JP] Japan .................. 60-137565
Jun. 24, 1985 [JP] Japan .................. 60-137566

[51] Int. Cl.4 .......................... A23N 4/00; A23N 4/24
[52] U.S. Cl. ........................................ 99/484; 62/378;
62/380; 62/381; 99/510; 99/513; 99/517;
99/537; 99/538

[58] Field of Search ................. 99/517, 516, 567, 510,
99/513, 537, 538, 485, 646, 484; 426/475, 506,
481, 524; 62/380, 381, 378

[56] References Cited

U.S. PATENT DOCUMENTS

| 2,836,368 | 5/1958 | McCoy | 99/517 |
| 4,171,625 | 10/1979 | Morgan et al. | 99/517 X |
| 4,300,448 | 11/1981 | Hayashi et al. | 99/537 X |

Primary Examiner—Timothy F. Simone
Attorney, Agent, or Firm—Kane, Dalsimer, Sullivan, Kurucz, Levy, Eisele and Richard

[57] ABSTRACT

An apparatus for separating juice sacs of a citrus fruit, including: freezing means for freezing the citrus fruit with a cryogenic liquid refrigerant; crushing device for crushing a frozen citrus fruit; and separating device for separating juice sacs from the crushed citrus fruit.

11 Claims, 10 Drawing Sheets

APPARATUS FOR SEPARATING JUICE SACS OF CITRUS FRUITS

BACKGROUND OF THE INVENTION

The present invention relates to an apparatus for separating juice sacs of citrus fruits such as lemon, orange, and grapefruit without giving damages to them.

Such citrus fruits include a peel and segments wrapped with the peel, each segment having a segment sac and a multiplicity of juice sacs included in it. Juice sacs are separated individually and then packed in a can or mixed in a citrus juice for sale.

Heretofore, the juice sacs separating apparatus is composed of a tank for removing segment sacs of a citrus fruit with an acid or alkali solution, a washing tank for washing the segment sacs removed juice sacs with water, and a separating device for separating the washed juice sacs. In this prior art juice sacs separating apparatus, segment sacs of the citrus fruit are removed by melting them in the solution tank to obtain an aggregate of juice sacs, which is then washed by water to remove the acid or alkali solution. Thereafter, the juice sacs aggregate is passed through hot water to weaken their adhesive strength to each other and then transferred to the separating device where it undergoes a direct impact, such as caused by stirring, or an indirect impact such as by hydraulic pressure, vortices and steam. The prior art juice sacs separating apparatus has the following disadvantages. Firstly, processing of the citrus fruit takes rather long time and waste water and solution treatment is costly. Secondly, nutritive substances such as vitamin C contained in juice sacs are largely lost since they are exposed to heat in addition to the treatment solution and water. Lastly, the prior art juice sacs separating apparatus contains some manual processes which are laborious.

SUMMARY OF THE INVENTION

Accordingly, it is an object of the present invention to provide an apparatus for separating juice sacs of citrus fruit which apparatus is capable of separating juice sacs within a fairly short time as compared to the prior art with less loss of nutritive substances than the latter.

It is another object of the present invention to provide an apparatus for separating juice sacs of citrus fruit which apparatus involves no waste water and solution problems.

It is still another object of the present invention to provide an apparatus for separating juice sacs of citrus fruit which is less laborious in operation than the prior art apparatus.

With these and other objects in view, the present invention provides an apparatus for separating juice sacs of a citrus fruit, including: freezing means for freezing the citrus fruit with a cryogenic liquid refrigerant; crushing device for crushing a frozen citrus fruit; and separating device for separating juice sacs from the crushed citrus fruit.

BRIEF DESCRIPTION OF THE DRAWINGS

The invention will now be described by way of example with reference to the accompanying drawings in which.

DETAILED DESCRIPTION OF THE PREFERRED EMBODIMENTS

Figure 1:
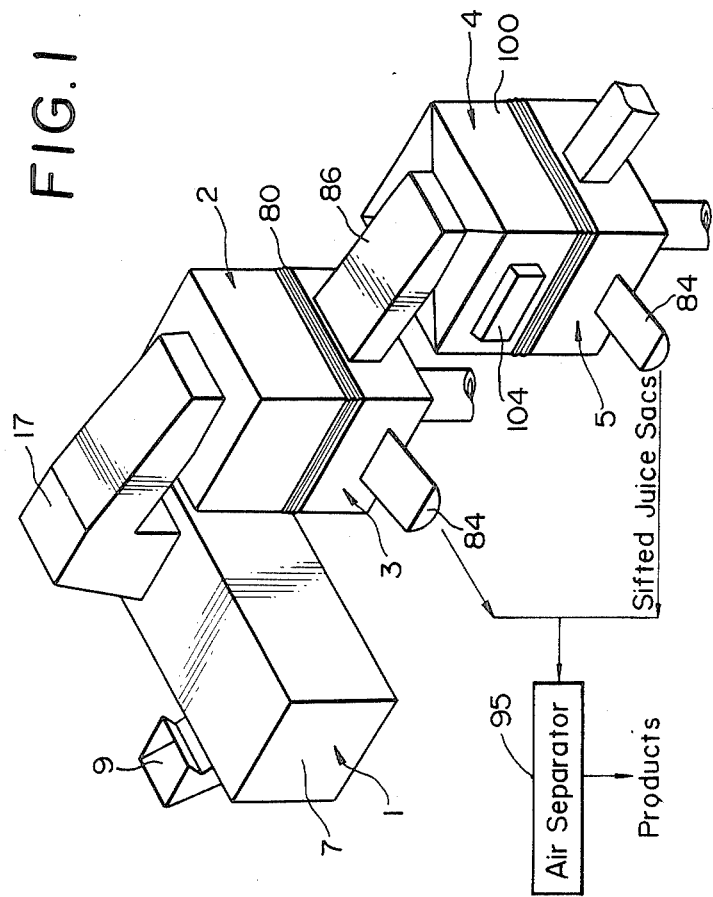
FIG. 1 illustrates a diagrammatical perspective view of an apparatus for separating juice sacs of a citrus fruit constructed according to the present invention.

FIG. 1 illustrates an apparatus separating juice sacs of a citrus fruit such as a lemon according to the present invention, in which reference numeral 1 designates a refrigerating unit with a low-temperature refrigerant, to which are subsequently connected a first crusher 2 and a first screening device 3, to which are subsequently connected a second crusher 4 and a second screening device 5.

Figure 2:
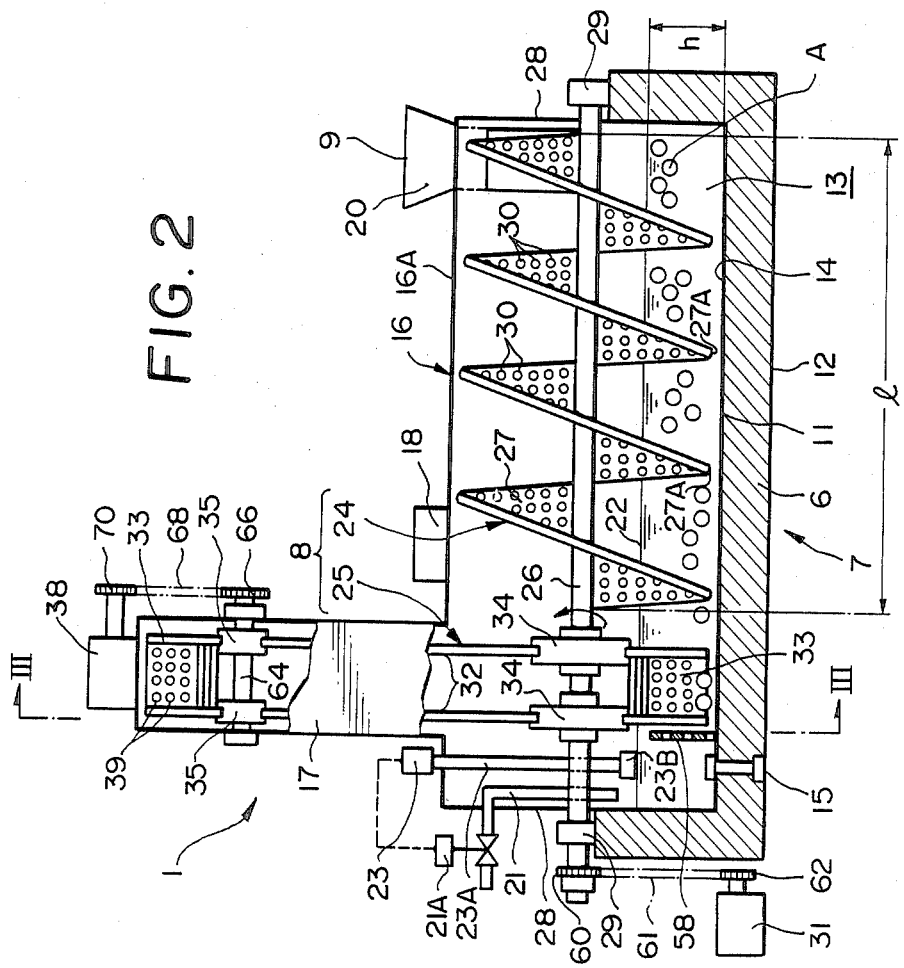
FIG. 2 is a side view, partly in section, of the refrigerating device in FIG. 1.
Figure 3:
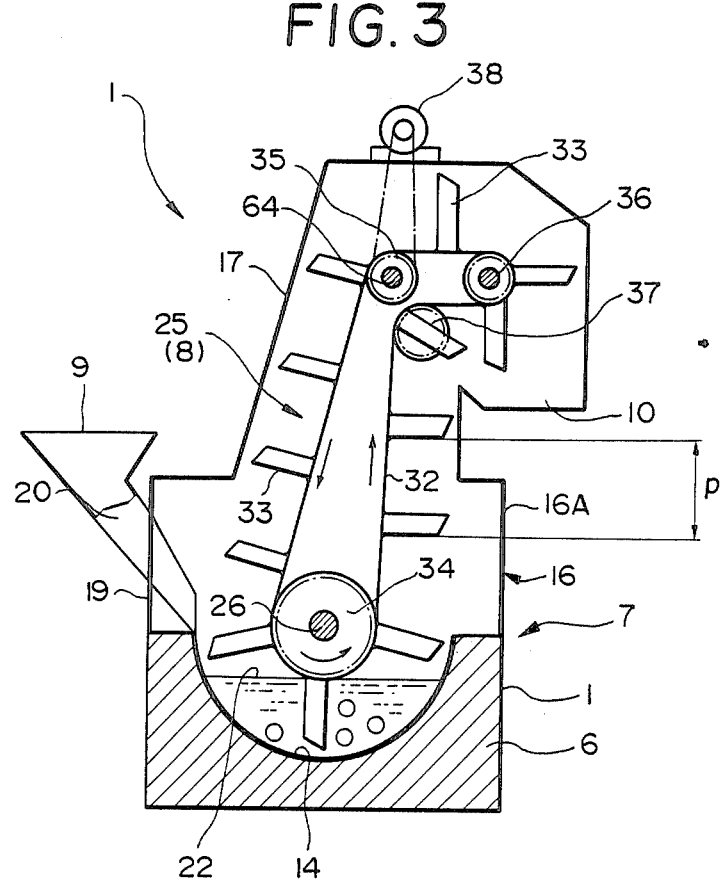
FIG. 3 is a view taken along the line III—III in FIG. 2.

As more clearly illustrated in FIGS. 2 and 3, the refrigerator 1 is composed of a housing 7, having a reservoir 6 for storing a liquid refrigerant, and a transferring device 8 for discharging fruit A supplied to the reservoir 6. The refrigerator 1 refrigerates the fruit A to a temperature of about −50° C. or lower. The housing 7 is provided with an inlet 9 and an outlet 10. A liquid refrigerant such as liquid nitrogen (boiling point: −196° C.) or liquid argon (boiling point: −186° C.) is stored in the reservoir 6. The reservoir 6 has a known insulating structure; it is composed of an inner wall 11 and an outer wall 12 made of a material for cryogenic use such as stainless steel, and a known (not shown) insulating material is interposed between the inner wall 11 and the outer wall 12. The inner wall 11 constitutes a refrigerant pool 13 for storing a liquid refrigerant. The refrigerant pool 13 is substantially semi-circular in cross section. The bottom surface 14 of the refrigerant pool 13 is formed to run substantially horizontally from the side of the inlet 9 to the side of the outlet 10. A drain hole 15, which is opened as occasion demands, is provided in the bottom at one end (on the left side in FIG. 2) of the reservoir 6. A baffle plate 58 is erected at a position close to one end of the refrigerant pool 13 of the reservoir 6. The baffle plate 58 is provided with a multiplicity of holes and prevents the fruit supplied to the refrigerant pool 13 from moving to a position closer to one end than the position where buckets 33 of an elevator-type transferring means 25 (which will be described later) rotate.

A cover 16 having the inlet 9 and the outlet 10 is provided at the upper portion of the reservoir 6. The main body 16A of the cover 16 is substantially box-shaped, and the reservoir 6 and the cover 16 together form a space for accommodating a transferring means 8 within the housing 7. An upright discharging tower 17 is provided at the top portion at one end of the cover body 16A. The discharging tower 17 surrounds substantially the upper half of the elevator 25 of the transferring means 8 which will be described later. The discharging tower 17 has substantially inverted L-shaped side surfaces as shown in FIG. 3, and the end of the lower bent portion is opened so as to form the outlet 10. The outlet 10 is the opening through which the fruit refrigerated or frozen in the refrigerant pool 13 are taken out. An exhaust port 18 is provided in the central portion of the cover body 16A. A chute 20 is provided at the upper portion of a side wall 19 at the other end of the cover body 16A, and the opening at the upper portion of the chute 20 constitutes the inlet 9. The inlet 9 is the opening through which fruit is supplied to the reservoir 6. A refrigerant supply pipe 21 for supplying a refrigerant from a tank (not shown) to the refrigerant pool 13 and a detecting portion 23A of a known liquid level detector 23, which detects the liquid level 22 of the reservoir 6, penetrate through the side wall at one end of the cover body 16A. The liquid detector 23 and a solenoid 21A, which is provided in the refrigerant supply pipe 21 and which is controlled by the liquid detector 23, maintain the liquid level 22 of the liquid refrigerant at a constant level.

The transferring means 8 is provided in the housing 7 of the above-described structure. The transferring means 8 subsequently transfers the fruit to the outlet 10 which are supplied from the inlet 9 to the refrigerant pool 13 of the reservoir 6, and is composed of a screw type transferring means 24 (hereinunder referred to as a "screw") and the elevator type transferring means 25 (hereinunder referred to as an "elevator").

The screw 24, which transfers to the elevator 25 the fruit supplied from the inlet 9, is composed of a screw shaft 26 and a screw blade 27 which is integrally provided around the screw shaft 26. The screw 24 is provided such as to extend from the side of the inlet 9 of the housing 7 to the side of the elevator 25. The screw shaft 26 of the screw 24 extends substantially horizontally along the axis of the bottom surface 14, penetrates through the side walls 28 at both ends of the cover body 16, and is supported by bearings 29 provided on the upper surface at both ends of the reservoir 6. The screw shaft 26 is situated above the liquid level 22 of the refrigerant pool 13.

The screw blade 27 extends from the vicinity of the lower portion of the inlet 9 to the vicinity of the lower portion of the elevator 25. The clearance between the bottom points 27A of the blade 27 and the bottom surface of the reservoir 6 is set to be small enough to carry the fruit A. A multiplicity of holes 30 are formed through the screw blade 27. These holes are large enough for the liquid refrigerant to pass freely but do not allow the fruit to be refrigerated to pass therethrough. A sprocket wheel 60 is attached to one end of the screw shaft 26, and is connected to a driving device 31 with a built-in electric motor (not shown) through a chain 61 and a sprocket wheel 62.

Figure 4:
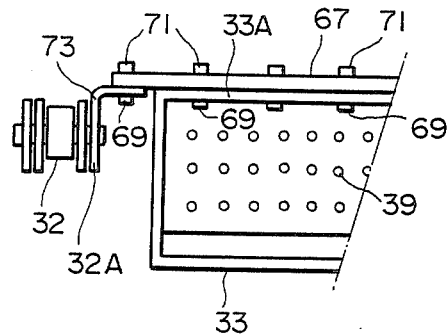
FIG. 4 is an enlarged fragmentary plan view of each bucket in FIG. 3.
Figure 5:
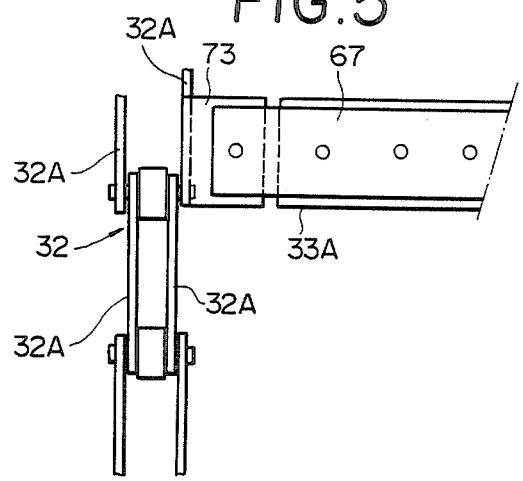
FIG. 5 is a rear view of the bucket in FIG. 4.

The elevator 25 of the transferring means 8 elevates the fruit transferred by the screw 24 to the outlet 10. In this embodiment, a bucket elevator which is composed of a pair of endless chains 32 and a plurality of (12, in this embodiment) buckets 33 is used as the elevator 25. This elevator 25 is provided between the portion of the screw shaft 26 where there is no screw blade 27, namely at the forward end of the screw shaft 26, and the outlet 10 of the housing 7. The chains 32 of the elevator 25 extend so as to run in an inverted L-shape by four pairs of sprockets 34, 35, 36, and 37, and are moved as is indicated by the arrows in FIG. 3. The lowermost sprockets 34 are rotatably attached to the screw shaft 26 of the screw 24. A sprocket wheel 66 is attached to the shaft 64 of the sprockets 35 provided at the bent portion, and is connected to a driving device 38 with an electric motor (not shown) through a chain 68 and a sprocket wheel 70. The buckets 33 of the elevator 25 scoop up the citrus fruit in the refrigerant pool 13 and elevate them to the outlet 10. Each of the buckets 33 is mounted perpendicularly to the parallel chains 32 and 32 at substantially equal intervals. The joint structure of the buckets 33 to the chains 32 and 32A is more detailedly illustrated in FIGS. 4 and 5. The rear end wall 33A of each bucket 33 is jointed to a connecting plate 67 by means of bolts 69 and nuts 71. Each of opposite ends of the connecting plate 67 is jointed by means of bolt 69 and nut 71 to a bracket member 73 which is welded to a link 32A of corresponding chain 32. Thus, the buckets 33 are disposed between the two chains 32. The shape of the bucket 33 is formed like a shallow plate or a deep basket in accordance with the kind of fruit, in order to efficiently scoop up citrus fruit. A multiplicity of holes 39 are provided in the bucket 33 of the elevator 25 in order to vent the liquid refrigerant. These holes 39 are large enough for the liquid refrigerant to pass freely but do not allow the fruit to pass therethrough. The size of the bucket 33 is set to be just enough for the free end of the bucket 33 to move along the bottom surface 14 of the refrigerant pool 13 of the reservoir 6 after scooping up the fruit A by the rotation of the lowermost sprockets wheels 34.

Figure 6:
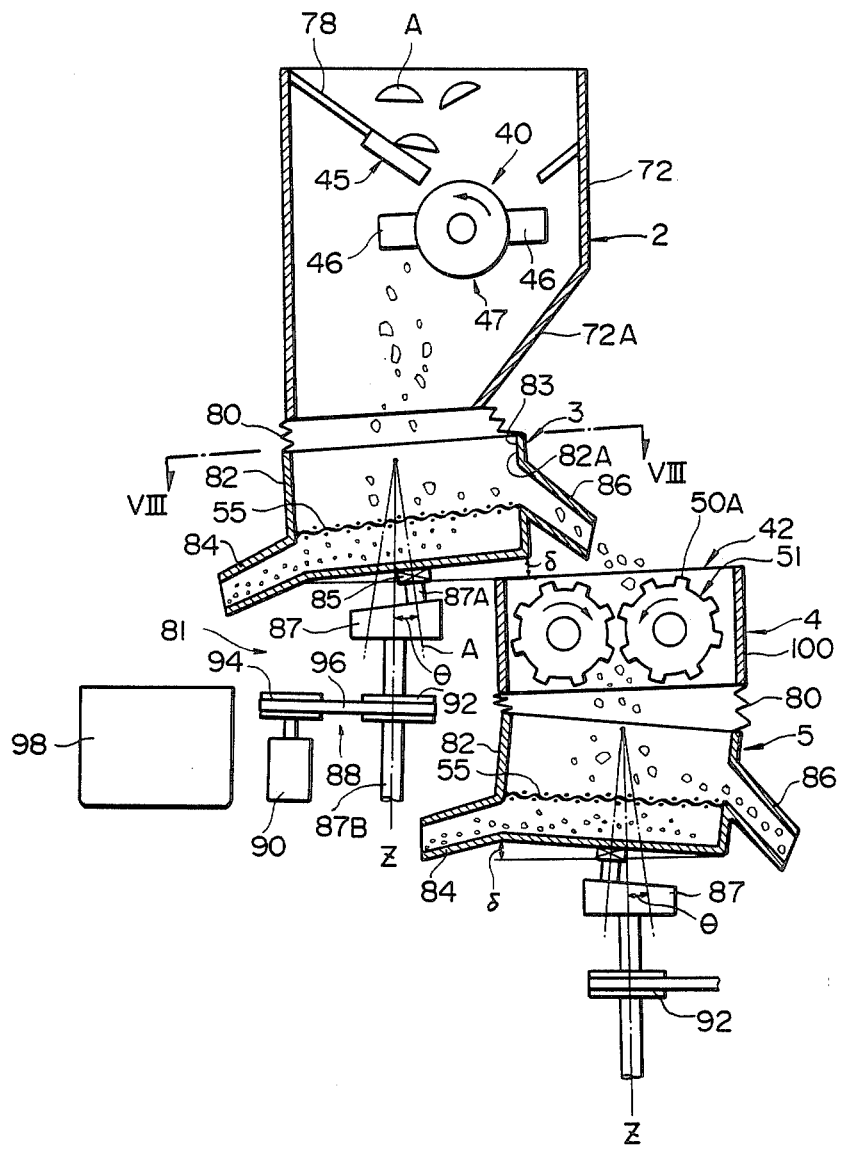
FIG. 6 is an axial cross-sectional view of crushers and screening devices in FIG. 1.
Figure 7:
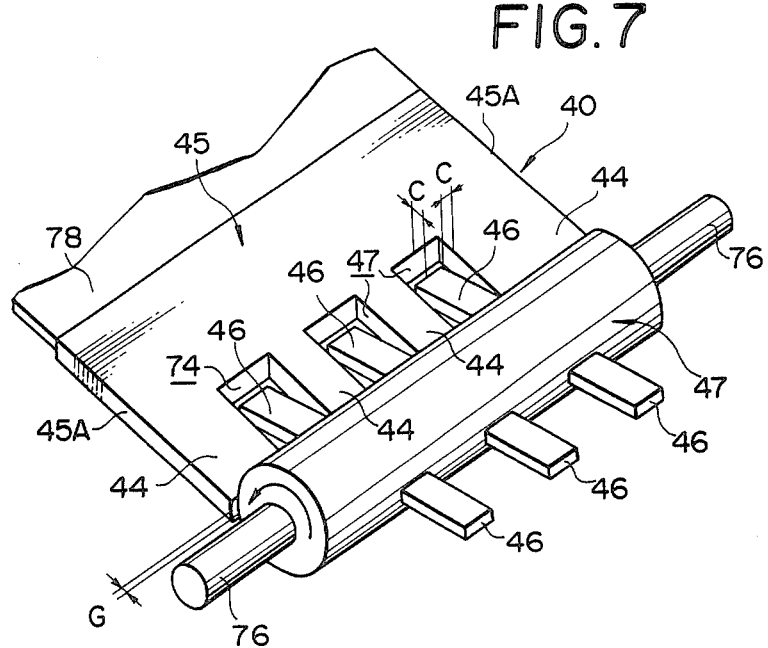
FIG. 7 is an enlarged perspective view of the blade and the roller, shown in FIG. 6, for crushing a frozen fruit in cooperation with the blade.
Figure 8:
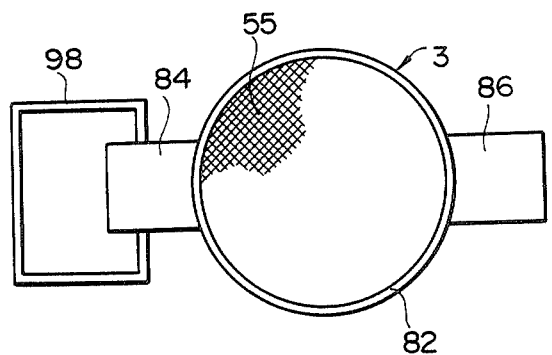
FIG. 8 is an enlarged plan view of the screening device in FIG. 6.

Referring next to FIGS. 6 and 7, a first shearing-type crushing machine 40 is built in a casing 72 of the first crusher 2, the casing being mounted on a frame now shown. The crushing machine 40 is provided with a stationary blade 45 opposite ends 45A of which are fixed to the inner walls of the casing 72 so as to be inclined relative to the horizontal plane, and with a rotary roller 46 which crushes the frozen fruit A in cooperation with the stationary blade 45. A multiplicity of, four in this embodiment, cutting blades 44 are provided at regular intervals in the lower end portion of the stationary blade 45, thereby forming three recesses 74 between the teeth 44. Multiplicity pairs, three pairs in this embodiment, of projections 46 are provided at diametrically opposite positions of the peripheral surface of the roller 47 at the same pitch as the cutting blades 44. Journals 76 at opposite ends of the roller 47 are horizontally supported by bearings (not shown) attached to the inner walls of the casing 72 in such a manner that the projections 46 pass through the corresponding recesses 74 of the teeth 44 when the roller 47 is rotated. Each projection 46 is so designed that the projection 46 and the walls of corresponding recess 74 may form a clearance C sufficiently smaller than the fruit A and larger than the desired size of a crushed fruit when the projection 46 passes through the corresponding recess 74. A clearance G between the roller 47 and the tip of each tooth 44 is set to be substantially the same in as the clearance C. The proximal end of the stationary blade 45 is fixed to an inner wall of the casing 72 through a support board 78. This shearing-type crushing machine 40 crushes the fruit by striking the fruit, which has slid down to the teeth 44 of the stationary blade 45, with the projections 46 of the rotary roller 47.

This shearing-type crushing machine 40 is suitable for roughly crushing fruit.

A lower portion 72A of the casing 72 is formed in the shape of a hopper, and the first screening device 3 is disposed just beneath the lower portion 72A of the casing 72. The screening device 3 includes a cylindrical housing 82 of which upper opening 83 is connected to the lower portion 72A of the casing 72 by bellows 80. The housing 82 has a circular screen 55 secured to a middle portion of its inner wall 82A to be perpendicular to its axis. The screen 55 has an appropriate mesh size corresponding to a predetermined size of juice sacs to be screened. The casing 82 further has a fine juice sac outlet 84, integrally formed with its lower portion to communicate to its interior below the screen 55, and a coarse juice sac outlet 86 integrally formed with its middle portion to communicate to its interior above the screen 55. The casing 82 is supported by an oscillatory precession mechanism 81 for providing an oscilatory motion to it in a precession manner. The oscillatory precession mechanism 81 includes a supporting cylindrical member 87 having a concentric shaft 87B mounted on it and supported on a frame not shown for rotation about a vertical axis Z. The supporting cylindrical member 87 further has a supporting stub 87A mounted on its upper face so that the axis A of the supporting stub 87A intersects the vertical axis Z with an angle O. The casing 82 is mounted at its bottom through a thrust bearing 85 on a distal end of the supporting stub 87A to be rotatable about its axis and the axis A of the stub 87A. The shaft 87B of the oscillatory precession mechanism 81 is connected through a belt drive mechanism 88 to a drive unit 90 including an electric motor not shown, the belt drive mechanism 88 including a pulley 92 mounted around the shaft 87B, another pulley 94 mounted on an output shaft of the drive unit 90 and a belt 96 extending around the pulleys 92 and 94. A vessel 98 for receiving the fine juice sacs screened from the fine juice sac outlet 84 is located just beneath the outlet.

Figure 9:
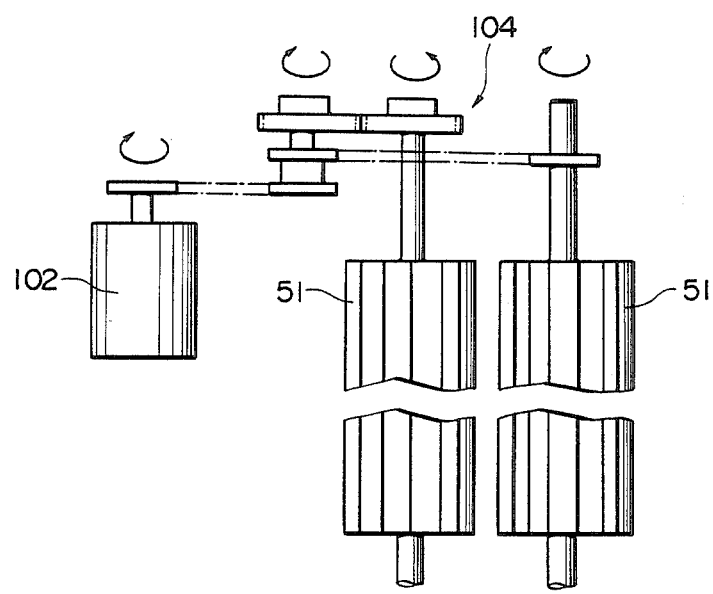
FIG. 9 is an enlarged plan view of the rollers of the second crusher in FIG. 6 and a driving unit for the rollers.
Figure 10:
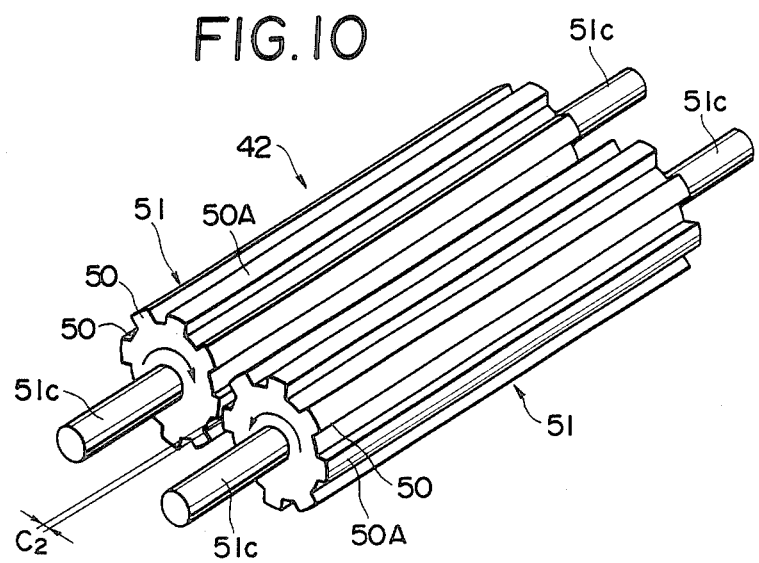
FIG. 10 is an enlarged perspective view of the rollers of the second crusher in FIG. 6.

The second crusher 4 is mounted on the frame not shown to be located just below the course juice sac outlet 86. A casing 100 of the crusher 4 is in the form of a square box with the upper and lower ends open. A roller type of crusher 42, which has a pair of rollers 51 which are illustrated in detail in FIGS. 9 & 10 is built into the casing 100. Journals 51C of the rollers 51 are supported horizontally and parallel to each other by bearings (not shown) which are attached to the casing 100. A plurality of, eight in this embodiment, axially-extending ridges 50 are formed at a regular pitch on the peripheral surface of each roller 51, and top surfaces 50A of the ridges 50 of one roller 51 face the top surfaces 50A of the corresponding ridges 50 of the other roller 51, with a clearance $C_2$ therebetween, as the rollers 51 rotate. One end of each journal 51C is connected to a known rotation driving device 102 including an electric motor via a conventional gear and chain transmission 104.

The second screening device 5 of a similar structure to that of the first screening device 3 is disposed just below the second crusher 4. The upper opening of the casing 82 of the second screening device 5 is connected to the lower opening of the casing 100 of the second crusher 4 by bellows 80.

The operation of the juice-sac-separating apparatus will now be described. When the apparatus is operated, a liquid refrigerant is first supplied from the refrigerant supply pipe 21 to the reservoir 6 of the refrigerator 1. The liquid level 22 of the liquid refrigerant is detected by a sensor 23B of the liquid level detector 23, and is maintained at a predetermined level by the actuation of a valve 21A. Since the outlet 10 is set at a position higher than the reservoir 6 in this refrigerator 1, it is possible to set the liquid level 22 of the refrigerant pool 13 high, thereby enabling the storage of a large amount of liquid refrigerant. It is also possible to prevent the cold gas from flowing out and, hence, any loss of refrigerant. Citrus fruits with or without their peels are next thrown into the refrigerator 1. Whole citrus fruit may be supplied but a better yield of juice sacs is obtained when each fruit is cut into pieces in advance. The fruit A slides down the chute 20 to the refrigerant pool 13 of the reservoir 6. The screw 24 of the transferring means 8 is rotated by the driving device 31, and the fruit A in the refrigerant pool 13 is subsequently conveyed toward the elevator 25 by the screw blade 27 of the screw 24. The fruit A is refrigerated or frozen during the transfer. The multiplicity of holes 30 provided in the screw blade 27 of the screw 24 allow the liquid refrigerant to pass freely therethrough, and thus prevent it from being carried toward the elevator together with the fruit A, or prevent a large gradient of liquid level from being generated. Accordingly, delay in the transfer of the fruit, which might be caused by the counterflow of the refrigerant due to the gradient of the liquid level is also prevented.

The elevator 25 of the transferring means 8 is driven by the driving device 38 at the top of the tower 17, and the fruit A conveyed below the elevator 25 by the screw 24 are scooped up by the buckets 33 of the elevator 25 and are subsequently lifted to the outlet 10 in the direction indicated by the arrows in FIG. 3. Since each bucket 33, when it is at a position nearest to outlet 10, is substantially perpendicular to the horizontal plane, as is indicated by the dot-dash line in FIG. 3, the fruit A which have been conveyed to that position drop out, and are fed from the outlet 10 to the crusher 2. Since the holes 39 are provided in the buckets 33 of the elevator 25, the liquid refrigerant escapes through them while the citrus fruit are being conveyed by the elevator 25, thereby preventing any loss of liquid refrigerant. In the refrigerator 1 in this embodiment, the screw shaft 26 of the screw 24 serves as the rotary shaft of the sprocket wheels 34 in the lower portion of the elevator 25, so that the bearing mechanism of the sprocket wheels 34, and, hence, the structure within the housing 7, can be simplified.

Citrus fruits are preferably refrigerated by the refrigerator 1 to a temperature of about −50° C. or less. If the temperature of the fruit is higher than about −50° C., the solidification of the juice sacs by freezing is insufficient, and they are likely to be damaged by the crushing in the crushers 2 and 4. Refrigeration by the refrigerator 1 is preferably carried out rapidly in order to keep the juice sacs fresh. In a citrus fruit refrigerated in the above-described way, the peel, the membranes and the pith which binds them closely together, become brittle, and the juice sacs wrapped in their membranes are frozen separately and are likely to separate from each other.

The citrus fruit refrigerated in this way are subsequently thrown onto the stationary blade 45 of the crushing machine 40, which constitutes the first crusher 2. The fruit thrown onto the stationary blade 45 slide on it to teeth 44 and strike the projections 46 of the rotary roller 47. This impact crushes the segments of the citrus fruit and breaks the membranes, so that most of the juice sacs wrapped in the membranes are separated from each other and scattered outside. In this way, the citrus fruit are crushed into small pieces of membranes and separated juice sacs by the first crusher 2, but this mixture also includes insufficiently crushed or still un-crushed segments.

The fruit which have passed through the first crusher 2 are fed to the first screening device 3. In the first screening device 3, the separated juice sacs are collected by sifting them from the small pieces of membranes and uncrushed segments. During this time, since the screen 55 of the first screening device 3 is oscillatingly, precessing, the juice sacs are made to stand on the screen 55 such as to be longitudinally perpendicular to the screen 55, and pass through the screen in that state. In this manner, the juice sacs are efficiently sifted and discharged from the fine juice sac outlet 84.

The fruit which cannot pass through the screen 55 of the first screening device 3 are fed to the second crusher 4 through the outlet 86 and are further crushed. The second crusher 4 is composed of the roller-type crusher 42. The uncrushed segments and the like which have been supplied between the rollers 51 are compressed by the opposing ridges 50A, so that the membranes are broken into small pieces and the remaining juice sacs are separated.

The fruit which have been crushed by the second crusher 4 are supplied to the second screening device 5 and sifted again. The juice sacs screened by the second screening device 5 are discharged from the fine juice sac outlet 84 and are allowed to join the juice sacs which have been screened by the first screening device 3, and are completed as the products by the removal of the slight amount of impurities which are still mixed with the juice sacs obtained, such as small pieces of membranes, by a well-known wind-powered selecting device or air separation device 95.

Figure 11:
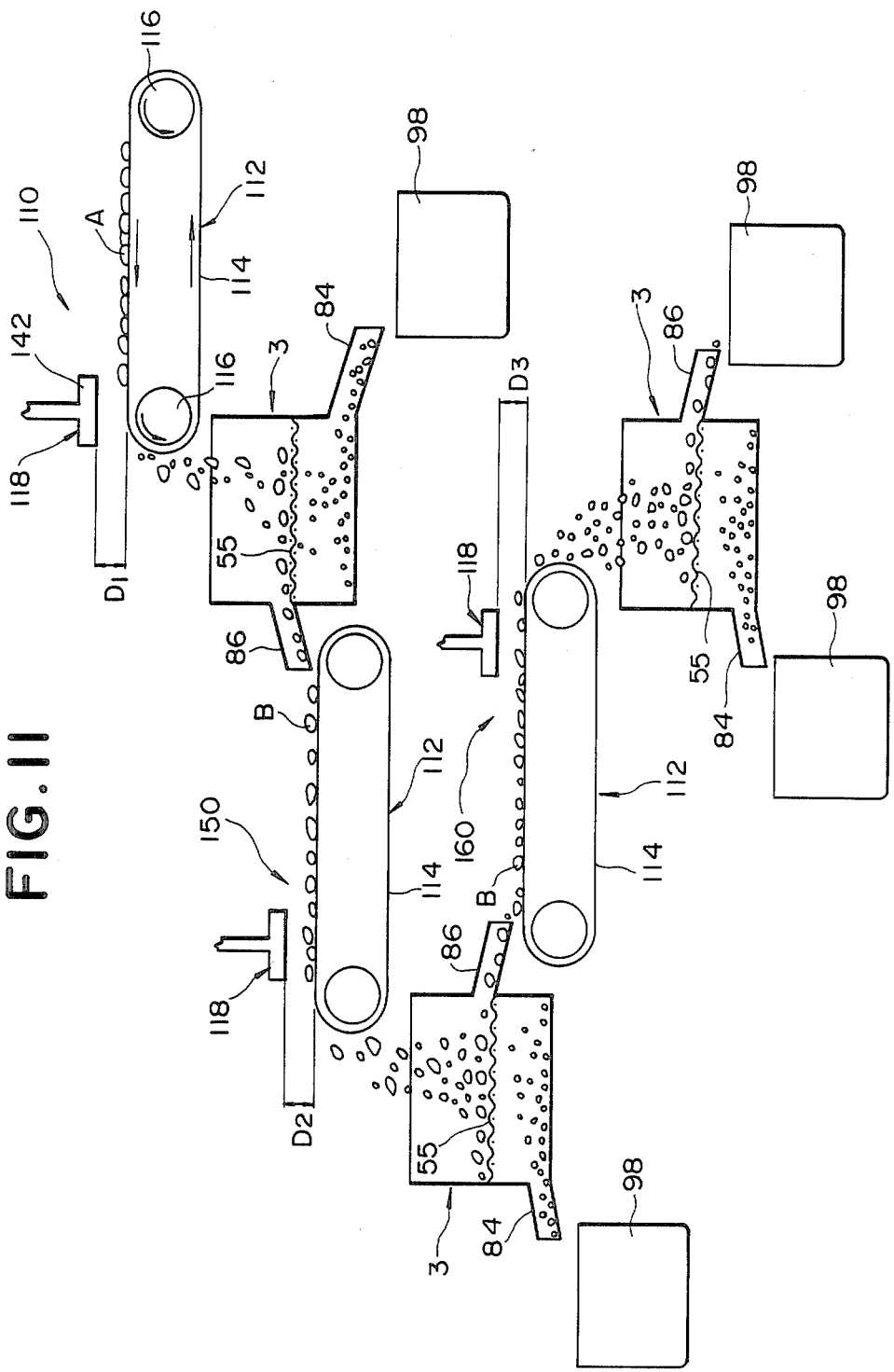
FIG. 11 is a diagrammatical side view, partly in section, of another embodiment of the present invention.
Figure 12:
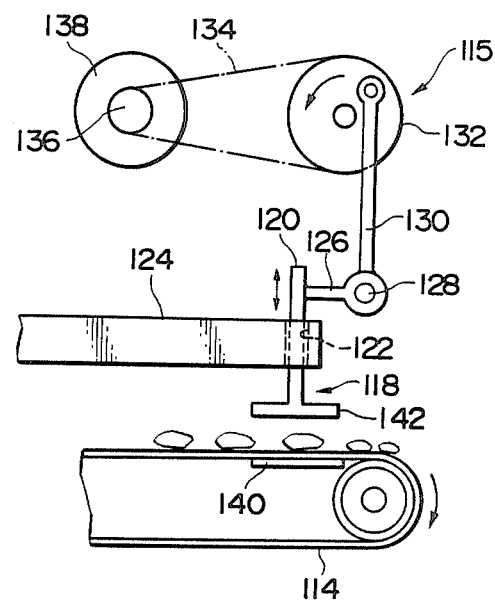
FIG. 12 is an enlarged fragmentary side view of the first crusher in FIG. 11.
Figure 13:
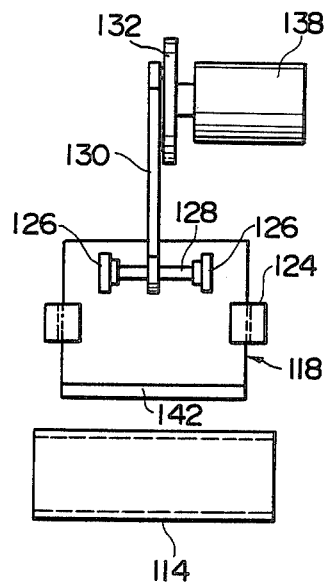
FIG. 13 is a front view of the first crusher in FIG. 12.
Figure 14:
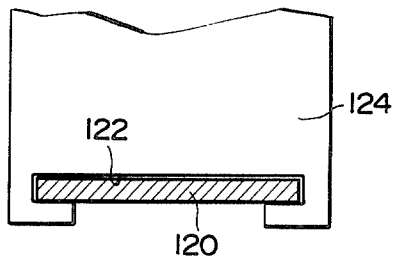
FIG. 14 is an enlarged fragmentary plan view, partly in section, of the frame in FIG. 12.

FIG. 11 shows another example of a juice-sac-separating apparatus. This juice-sac-separating apparatus is composed of a first crusher 110, a second crusher 150, and a third crusher 160, which have the same structure and are disposed to the refrigerator 1 in series. The screening device 3 which is the same as that in the first embodiment is provided to each of the crushers 110, 150 and 160. In this embodiment a press-type crushing machine is used as the first to third crushers 110, 150 and 160. Each crusher is composed of a belt conveyor 112 and a pressing unit 115 disposed above the belt conveyor 112. The belt conveyor 112 has a conventional reticulate or planar endless belt 114 extending horizontally between a pair of belt pulleys 116. The pressing unit 115 includes a press hammer 118 having an inverted T-shaped profile, of which stem portion 120 is inserted into a T-shaped guide groove 122, formed in a frame 124, for vertical slide. The stem portion 120 of the press hammer 118 has a pair of bracket arms 126 and 126 which horizontally support a pin 128. A crank arm 130 is pivotably connected at its one end to the pin 128 and at the other end to a crank disc 132, which is connected via an endless belt 134 to an output shaft 136 of a driving unit 138 which includes an electric motor not illustrated. A stationary plate 140 is disposed just below the press hammer 118 so as to cooperate with a press plate 142 of the press hammer 118 for crushing fruit conveyed on the conveyor belt 114 through the conveyor belt. By actuating the drive unit 138 the crank disc 132 is rotated through the endless belt 134, thus vertically moving the press hammer 118 in a reciprocating manner via crank arm 130. When the press hammer 118 is moved downwards, the refrigerated fruit A, which has been conveyed by the conveyor belt 114, is crushed by the press plate 142 and the stationary plate 140 to separate juice sacs. The clearances D1, D2 and D3 between the press plates 142 of press hammers 118 and corresponding belt conveyors 112 are gradually reduced and the stroke of each press hammer 118 is set so that an appropriate impact is applied to the refrigerated fruit A or crushed pieces thereof for crushing them in a predetermined size. Broken pieces of fruit A in the crusher 110 are supplied to screening device 3 disposed in the vicinity thereof, where they are separated into fine juice sacs and coarse pieces in the manner as previously described. The former are supplied through the fine juice sacs outlet 84 to receptacle 98 while the latter are led through the coarse juice sacs outlet 86 to the belt conveyor 112 of the second crusher 150, and then via screening device 3 to the third crusher 160. In the second and the third crushers 150 and 160, operations similar to operations of the first crusher 110 are applied to still coarse juice sacs.

Figure 15:
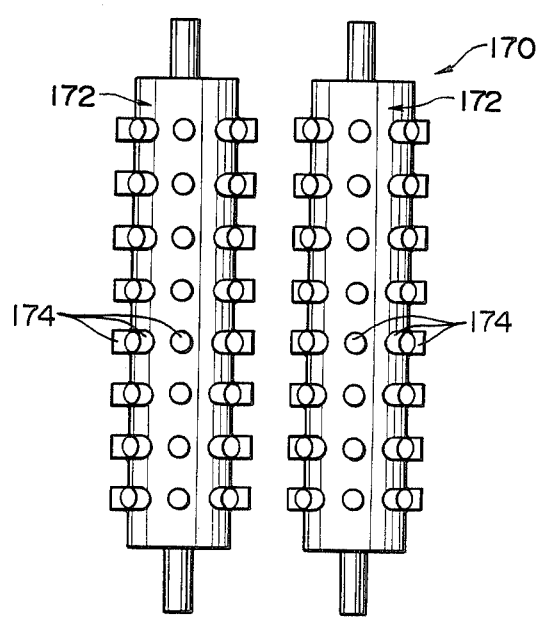
FIG. 15 is an enlarged plan view of a modified form of the rollers in FIG. 10.
Figure 16:
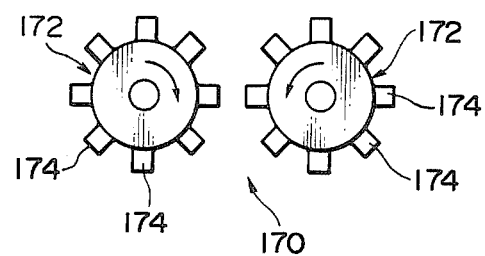
FIG. 16 is a side view of the rollers in FIG. 15.

FIGS. 15 and 16 illustrate a modification of the rollers 51 and 51 in FIG. 10. In this modification, a pair of rollers 172 each have eight rows of projections 174 mounted on the circumferential faces thereof. The two rollers 172 and 172 are supported on the housing 100 in the same manner as the two rollers 51 and 51.

The screening device 3 may be replaced by various known screening devices such as a wind-powered selecting device, a selecting device utilizing a swirl such as a cyclone, and a gravity selecting device utilizing the phenomenon of sedimentation or flotation.

The bottom surface 14 of the refrigerant pool 13 of the reservoir 6 need not be horizontal; it can be formed so as to gradually incline downward toward the outlet 10 or the inlet 9. Alternatively, the refrigerant pool 13 may be formed so that it is deep only in the portion where the buckets 33 of the elevator 25 move. It is evident that the screw blade 27 of the screw 24 and the bucket 33 of the elevator 25 may be formed of wire net or the like.

Although juice-sac-separating apparatuses provided with two or three crushers are shown in the above-described embodiment, the number of the crushers may be one, four, or more.

EXAMPLE 1

The juice sac-separating apparatus shown in FIGS. 1 to 10 was built and the juice sacs of lemons were separated thereby. The specification of the apparatus was as follows:

(I) Refrigerator 1
   A. Screw 24
      total length of screw blade 27 $l = 1,100$ mm pitch of screw blade 27 = 250 mm × 4
diameter of screw blade 27 = 800 mm
diameter of hole 30 = 10 mm
number of holes 30 = 2,500/m²
rate of rotation of screw = 2 rpm
B. Elevator 25
pitch of buckets 33 × number = 300 mm × 12
effective length of bucket 33 × width = 155 mm × 125 mm (corresponding to about four lemons)
diameter of hole 39 × number per each bucket 33 = 2.5 mm × 900
diameter of sprocket 34 = 500 mm
speed of operation = a speed at which 12 buckets full (in terms of the bucket 42) of lemons are conveyed per minute
C. Liquid refrigerant: liquid nitrogen (−196° C.)
depth of refrigerant pool 13 h = about 150 mm
This depth h was determined by calculating the radius of the screw blade 27 minus the radius of the sprocket 34
(II) First Crusher 2
A. clearance C between teeth 44 of stationary blade 45 and projections 46 of rotary roller 47 C = about 5 mm
B. clearance C between stationary blade 45 and rotary roller 47 G = about 3 mm
C. rate of rotation of rotary roller 47 = 360 rpm
(III) Second Crusher 4
A. clearance between rollers 51 $C_2$ = about 7 mm
B. circumferential width of ridge 50 = 7 mm
C. height of ridge 50 = 3 mm
D. outer diameter of roller 51 = 90 mm
E. number of revolutions of roller 51 per minute = 25 rpm
(IV) Screening devices 3, 5
A. size of meshes of screen 55 = 5 mesh
B. amplitude δ of the casing 82 = 60 mm
C. number of revolutions of cylindrical member 87 per minute = 360 rpm
D. oscillation angle of rotation axis ¼ = 7 degrees
(V) Lemons to be processed
A. the major axial length of each lemon with its peel = about 80 mm
the minor axis length of each lemon with its peel = about 55 mm
average weight of each lemon with its peel = 125 g
B. weight of each peeled lemon = 50 to 60 g
C. length of each juice sac = 11 to 14 mm diameter of each juice sac = 3 to 3.5 mm About 8 kg of lemons were prepared, and about 5 kg of lemons were remained after the removal of their peels. Each of these peeled lemons was divided in half and thrown into the refrigerator 1. The temperature of the lemons refrigerated in the refrigerator 1 was −120° C. After they were crushed by means of the first crusher 2, 2.8 kg of juice sacs were obtained from the first screening device 3. The remaining pieces of the lemons, which contained insufficiently crushed or still uncrushed segments, have an average size of 10 to 20 mm × 10 mm × 10 mm. These were supplied to the second crusher 4, and 0.7 kg of juice sacs were obtained from the second screening device 5. The impurities were removed from the juice sacs, obtained in this way, by a 1.3 m/s wind speed wind-powered selecting device, and 3.15 kg of juice sacs were obtained in total (the ratio of the juice sacs to the whole peeled lemons was 63%). The juice sacs obtained had been almost completely separated from each other with little damage to them and the quality thereof was excellent.

EXAMPLE 2

The separation of juice sacs of grapefruits was conducted by the juice-sac separating apparatus shown in FIG. 11 with the refrigerator used in the Example 1. The juice-sac separating apparatus was operated on the following conditions:
(I) First crusher 110
clearance $D_1$ between belt conveyor 112 and press hammer 118 = 50 mm
(II) Second Crusher 150
clearance $D_2$ = 25 mm
(III) Third crusher 160
clearance $D_3$ = 9 mm
(IV) Screening devices 3 were operated in the same conditions as in the Example 1.
(V) Grapefruits to be processed
A. average major axial length of each grapefruit with its peel = about 96 mm
average minor axial length of each grapefruit with its peel = about 75 mm
average weight of each grapefruit with its peel = 400 g
B. average weight of each peeled grapefruit = 350 g
C. length of each juice sac = 13 to 20 mm
diameter of each juice sac = 3 to 4.2 mm About 2.5 kg of grapefruits were obtained after the removal of their peels. Each of these grapefruits was divided into two and thrown into the refrigerator. The temperature of the halves of grapefruits refrigerated in the refrigerator 1 was −100° C. They were placed on the belt conveyor 112 of the first crusher 110 with their sections facing upward, and were crushed. After screening them by means of the first screening device 3, 1.26 kg of juice sacs were obtained. As a result of crushing the remaining pieces of the grapefruits with the second crusher 150, 0.6 kg of juice sacs were obtained from the second screening device 3. The still remaining pieces were crushed by the third crusher 160, and 0.24 kg of juice sacs were obtained from the third screening device 3. The impurities were removed from the juice sacs obtained in this way by a 1.5 m/s wind-speed wind-powered selecting device, and 1.9 kg of juice sacs were obtained in total (the ratio of the juice sacs to the whole peeled grapefruit was 76%). The juice sacs obtained had been almost completely separated from each other with little damage to them and the quality thereof was excellent.

While the invention has been disclosed in specific detail for purposes of clarity and complete disclosure, the appended claims are intended to include within their meaning all modifications and changes that come within the true scope of the invention.

What is claimed is:
1. An apparatus for separating juice sacs of a cirus fruit, comprising:
freezing means for freezing the citrus fruit with a cryogenic liquid regrigerant;
crushing means for crushing the frozen citrus fruit; and
separating means for separating juice sacs from the crushed citrus fruit, wherein said freezing means comprises:
reservoir means for storing the cryogenic liquid refrigerant and for freezimg the fruit with the liquid regrigerant, the reservoir means including a first inlet for intorducing the fruit and a first outlet for discharging the frozen fruit, the first outlet being adapted to be disposed above a level of the liquid refrigerant in the reservoir means;

conveying means, mounted within the reservoir means, for conveying the introduced fruit in the liquid refrigerant for freezing and discharging means, mounted within the reservoir means, for discharging the frozen fruit, conveyed by the coveying means, through the first outlet, wherein said conveying means comprises: a shaft substantially horizontally and rotatably supported within said reservoir means; and a screw blade spirally mounted around the shaft for conveying in the liquid refrigerant the introduced fruit to the discharging means, the screw blade having first perforations formed therethrough for allowing the liquid refrigerant to pass through the first perforations, and wherein said discharging means comprises: a plurality of scoop means for scooping the conveying fruit; and an elevator, mounted within the reservoir means, for elevating the scooping means from a first position where the conveyed fruit is scooped up with the scoop means to a second position where where the elevated fruit is discharged through the first outlet and for lowering the scooping means form the first position to the second position.

2. An apparatus for separating juice sacs of a citrus fruit as recited in claim 1 wherein said freezing means comprises:

reservoir means for storing the cryogenic liquid refrigerant and for freezing the fruit with the liquid refrigerant, the reservoir means including a first inlet for introducing the fruit and a first outlet for discharging the frozen fruit, the first outlet being adapted to be disposed above a level of the liquid refrigerant in the reservoir means;

conveying means, mounted within the reservoir means, for conveying the introduced fruit in the liquid refrigerant for freezing and discharging means, mounted within the reservoir means, for discharging the frozen fruit, conveyed by the conveying means, through the first outlet.

3. An apparatus for separating juice sacs of a citrus fruit as recited in claim 1, wherein each said scoop means comprises a tray-shaped member having second perforations for allowing the liquid refrigerant to pass through the second perforations, and wherein said elevator comprises a chain drive mechanism including a pair of inverted generally L-shaped chains disposed in parallel with each other, the chains having the tray-shaped members mounted substantially perpendicularly thereto.

4. An apparatus for separating juice sacs of a citrus fruit, comprising:

freezing means for freezing the citrus fruit with a cryongenic liquid refrigerant;

crushing means for crushing the frozen citrus fruit; and separating means for separating juice sacs from the crushed citrus fruit. wherein said separating means comprises:

a first casing for receiving the crushed fruit, said casing including a first inlet for introducing the crushed fruit in the casing, a first outlet for discharging unseparated juice sacs and a second outlet disposed below both the first inlet and the first outlet for discharging separated juice sacs;

a sieve, having an axis, for screening the crushed fruit into the separated juice sacs and the unseparated juice sacs, the sieve disposed within the casing to partition an interior of the casing between the first outlet and the second outlet; and precession means, mounted on the casing, for providing a precession to the sieve about a vertical axis.

5. An apparatus for separating juice sacs of a citrus fruit as recited in claim 4, further comprising oscillating means, mounted on the first casing, for oscillating the sieve about the axis of the sieve.

6. An apparatus for separating juice sacs of a citrus fruit as recited in claim 5, wherein said crushing means comprises:

a second casing having a second inlet for entering the frozen citrus fruit and a third outlet, disposed below the second inlet, for discharging the crushed citrus fruit;

a blade member mounted at one end thereof to an inner face of the second casing between the second inlet and the third outlet so as to incline to a horizontal plane for sliding the frozen citrus fruit toward the other end, the blade member having teeth formed in the other end;

a first roller member having a plurality of projections and horizontally mounted within the second casing to be rotatable about an axis thereof so that the roller member is capable of crushing the frozen fruit by the projections in cooperation with the teeth of the blade member; and rotating means for rotating the roller member about the axis thereof so as to crush the frozen fruit with the projections and the teeth.

7. An apparatus for separating juice sacs of a citrus fruit as recited in claim 5, wherein said crushing means comprises:

a third casing having a third inlet for entering the frozen citrus fruit and a fourth outlet for discharging the crushed citrus fruit, the fourth outlet being disposed below the third inlet;

a pair of second rollers each having axial ridges formed in peripheral faces thereof in a circumferentially equi-spaced relationship, the second rollers being horizontally and rotatably mounted within the third casing in parallel with each other for crushing the frozen fruit by cramping the frozen fruit between facing ridges of the second rollers; and rotating means, mounted on the third casing for rotating the second rollers for cramping the crushed fruit with the facing ridges and then dropping the crushed fruit downwards.

8. An apparatus for separating juice sacs of a citrus fruit as recited in claim 5, wherein said crushing means comprises:

a belt conveyor horizontally disposed and including an endless belt for conveying the frozen fruit;

pressing means for pressing the frozen fruit conveyed by the belt conveyer, the pressing means including a pressing member disposed above the endless belt to be movable toward and away from the endless belt for applying an impact to the conveyed fruit to crush the conveyed fruit and moving means for moving the pressing member toward and away from the endless belt.

9. An apparatus for separating juice sacs of a citrus fruit, comprising:
freezing means for freezing the citrus fruit with a cryogenic liquid refrigerant;
crushing means for crushing the frozen citrus fruit; and
separating means for separating juice sacs from the crushed citrus fruit, wherein said crushing means comprises:
a casing having a inlet for entering the frozen citrus fruit and a outlet, disposed below the inlet, for discharging the crushed citrus fruit;
a blade member mounted at one end thereof to an inner face of the casing between the inlet and the outlet so as to incline to a horizontal plane for sliding the frozen citrus fruit toward the other end, the blade member having teeth formed in the other end;
a first roller member having a plurality of projections and horizontally mounted within the casing to be rotatable about an axis thereof so that the roller member is capable of crushing the frozen fruit by the projections in cooperation with the teeth of the blade member; and
rotating means for rotating the roller member about the axis thereof so as to crush the frozen fruit with the projections and the teeth.

10. An apparatus for separating juice sacs of a citrus furit, comprising:
freezing means for freezing the citrus fruit with a cryogenic liquid refrigerant;
crushing means, connected in series with the freezing means, for crushing the frozen citrus fruit discharged from the freezing means; and
separating means, connected in series with the crushing means, for separating juice sacs from the crushed citrus fruit,
said freezing means including:
reservoir means for storing the cryogenic liquid refrigerant and for freezing the fruit with the liquid refrigerant, the reservoir means including a first inlet for introducing the fruit and a first outlet for discharging the frozen fruit;
screw conveying means, mounted within the reservoir means, for conveying the introduced fruit in the liquid refrigerant from the first inlet toward the first outlet; and
discharging means for discharging the frozen fruit, conveyed by the conveying means, through the first outlet, the discharging means having one end mounted within the reservoir means near the first outlet and the other end having an outlet opening arranged above the reservoir means for discharging the conveyed fruit.

11. An apparatus for separating juice sacs of a citrus fruit as recited in claim 10, wherein said screw conveying means comprises: a shaft substantially horizontally and rotatably supported within said reservoir means; and a screw blade spirally mounted around the shaft for conveying in the liquid refrigerant the introduced fruit to the discharging means, the screw blade having first perforations formed threthrough for allowing the liquid refrigerant to pass through the first perforations, and wherein said discharging means comprises: a plurality of scoop means for scooping the conveyed fruit; and an elevator, mounted on the reservoir means, for elevating the scooping means from a first position where the conveyed fruit is scooped up with the scoop means to a second position where the elevated fruit is discharged through the outlet opening and for lowering the scooping means from the first position to the second position.

* * * * *